(12) United States Patent
Costa

(10) Patent No.: US 7,363,583 B1
(45) Date of Patent: Apr. 22, 2008

(54) METHOD AND SYSTEM FOR PROVIDING A COMPACT LAYOUT OF CONNECTED NODES

(75) Inventor: Jason Churchill Costa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 10/786,384

(22) Filed: Feb. 24, 2004

(51) Int. Cl.
*G06F 15/00* (2006.01)
*G06F 17/00* (2006.01)

(52) U.S. Cl. .................. 715/514; 715/734; 715/851

(58) Field of Classification Search ............. 715/500, 715/851, 514, 734; 345/661
See application file for complete search history.

(56) References Cited

U.S. PATENT DOCUMENTS

| | | | | |
|---|---|---|---|---|
| 5,895,474 A | * | 4/1999 | Maarek et al. | 715/514 |
| 6,133,914 A | * | 10/2000 | Rogers et al. | 345/661 |
| 2002/0087596 A1 | * | 7/2002 | Lewontin | 707/513 |
| 2005/0060647 A1 | * | 3/2005 | Doan et al. | 715/514 |
| 2005/0071783 A1 | * | 3/2005 | Atkins | 715/851 |

OTHER PUBLICATIONS

Xiaodi Huang, Wei Lai, Force-transfer: a new approach to removing overlapping nodes in graph layout, Feb. 2003, Proceedings of the 26th Australasian computer science conference—vol. 16 ACSC '03, Australian Computer Society, pp. 1-10☐☐.*

Carsten Friedrich, Falk Schreiber, Flexible layering in hierarchical drawings with nodes of arbitrary size, Jan. 2004, Proceedings of the 27th Australasian conference on Computer science—vol. 26 ACSC '04, Australian Computer Society, 11-369-376.*

Hasan, M.; Rahman, S.; Nishizeki, T.; A Linear Algorithm for Compact Box-Drawings of Trees; Oct. 2003.

Nguyen, Q.V.; Mao Lin Huang; Space-Optimized Tree: A Connection+Enclosure Approach for the Visualization of Large Hierarchies; Mar. 2003.

Soon Tee Teoh; Kwan-Liu Ma; RINGS: A Technique for Visualizing Large Hierarchies; 2002.

Carmel, L.; Harel, D.; Koren, Y.; Drawing Directed Graphs Using One-Dimensional Optimization; 2002.

* cited by examiner

*Primary Examiner*—William L. Bashore
(74) *Attorney, Agent, or Firm*—Perkins Coie LLP

(57) ABSTRACT

A topology of connected nodes can be arranged into a compact layout so that the difference between the width and the height of the layout is minimized. The topology of connected nodes can be arranged into a compact layout so that the aspect ratio of the width and the height is optimized toward a preferred value. A preferred width can be calculated and the connected nodes can be arranged so that the difference between the actual and preferred width of the compact layout is minimized.

10 Claims, 12 Drawing Sheets

GENERAL TOPOLOGY

METHOD AND SYSTEM FOR PROVIDING A COMPACT LAYOUT OF CONNECTED NODES

TECHNICAL FIELD

The present invention is generally related to computer software that can be used to create and manipulate documents. More specifically, the present invention can be used to arrange a topology of connected nodes into a compact layout.

BACKGROUND OF THE INVENTION

Layouts of connected nodes have a variety of uses, such as to graphically present data or information. Connected node layouts are often used to graphically present information in a hierarchical format. For example, a layout of connected nodes is typically used to present an organizational chart (or "org-chart"), which can graphically describe the hierarchical organization of personnel (e.g., managers, supervisors, employees, etc.) within a business, government, or other organized group. As another example, a layout of connected nodes is typically used to present a person's genealogy or ancestral history, which is a layout commonly referred to as a family tree. Connected layouts are also commonly used to present hierarchical classifications related to science and engineering, such as the genus-species organizations of plants and organisms.

Layouts of connected nodes also have other uses, which have developed with the advent of new technology. For example, connected node layouts are now used to map out the organization of links embedded in an Internet web page, which are typically hierarchically organized and often referred to as web diagrams or site trees. The use of layouts of connected nodes has also become popular to present the organization of files stored on a computer system, for example, in a file management program. As yet another example, connected node layouts have become very useful for aspects of computer science and software engineering, for example, through the use of binary trees.

Although the above described and other types of connected node layouts can be created manually (e.g., as a sketch or drawing), connected node layouts are typically generated by software programs. Similar to many other tasks that were traditionally done manually, such as writing, drawing, or mathematical calculations, the use of software programs to generate connected node layouts offers far more capability, flexibility, and convenience. However, existing approaches to generating connected node layouts with software programs are typically limited to several common layout formats. These formats include a tree layout, which typically has connected nodes arranged in a row by row hierarchy, and a circular layout, which typically has connected nodes arranged in a generally circular pattern emanating from a central node. In these and other formats, the nodes are typically connected by straight and/or curved lines.

A significant drawback to the connected node layouts provided by existing approaches, such as those described above, is that the dimensions of the layouts are typically undesirably disproportionate. For example, the overall width of a tree layout of connected nodes is typically much larger than the overall height of the layout. As a result, connected node layouts provided by existing approaches, particularly when more than a few connected nodes are involved, typically cannot be conveniently viewed or printed, for example, on a typical computer monitor (e.g., without scrolling or impractically zooming out the view) or on a typical sheet of paper (e.g., letter or legal sized). In the case, for example, of a tree layout, the width of the layout of connected nodes will typically be much wider than the width of a typical viewing area of a computer monitor or the typical printing area of a standard sized sheet of paper. As a result, existing approaches are typically unable to provide connected node layouts with more than a few nodes in a convenient format for analysis or presentation.

In consideration of the foregoing limitations of existing approaches, there is a need in the art for new approaches that can provide compact layouts of connected nodes. Such compact layouts need to allow connected nodes to be conveniently viewed and printed on typical mediums, such as a computer monitor or standard sized paper. Furthermore, such compact layouts need to arrange connected nodes so that the overall width and height of the layout are as proportional as possible to facilitate convenient viewing and printing of the connected nodes.

SUMMARY OF THE INVENTION

The present invention can provide a compact layout of connected nodes. For example, a topology of connected nodes can be arranged into a compact layout so that the difference between the width and the height of the compact layout is minimized. Such compact layouts can allow a topology of connected nodes to be conveniently viewed and/or printed on typical mediums, such as a computer monitor or standard sized paper. Furthermore, such compact layouts facilitate convenient presentation and analysis of a topology of connected nodes.

In a typical aspect of the present invention, an input of a topology of connected nodes can be received, for example, by a computer program. The exemplary computer program can arrange the topology of connected nodes into a compact layout so that the difference between the width and the height of the compact layout is minimized. The exemplary computer program can arrange the topology of connected nodes into a compact layout that has an aspect ratio of the width and the height that is optimized toward a preferred value. This capability may be useful to facilitate the presentation of the connected nodes within the dimensions of a preferred medium, such a computer monitor or printing paper. In accordance with other aspects of the invention, the exemplary computer program can arrange the topology of connected nodes based on a calculated preferred width, which can facilitate the width and height of the layout being proportional.

These and other aspects of the invention will be described further in the detailed description below in connection with the appended drawings and claims.

DETAILED DESCRIPTION OF THE EXEMPLARY EMBODIMENTS

Figure 1:
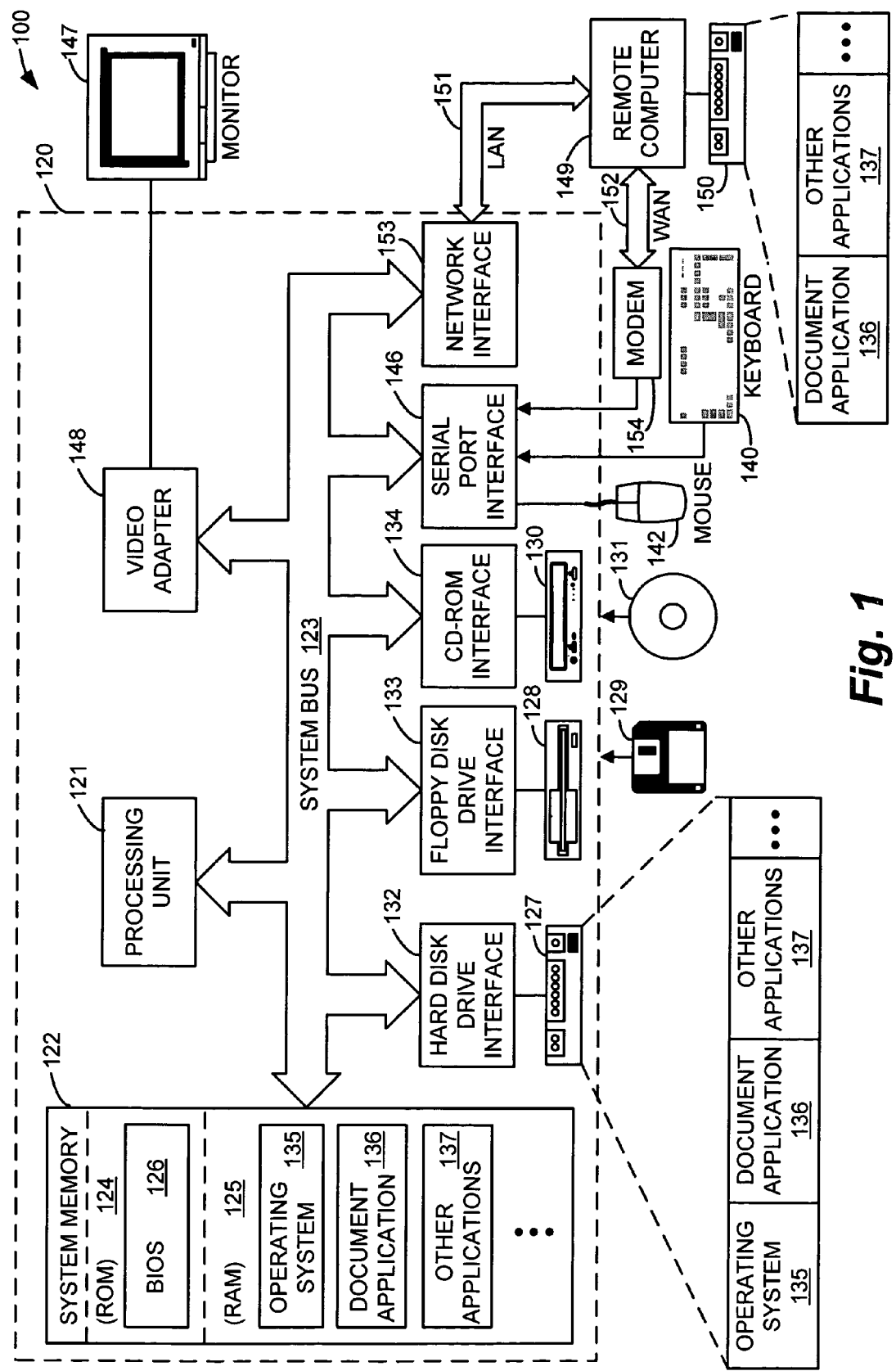
FIG. 1 is a block diagram illustrating an exemplary operating environment for implementing various exemplary embodiments of the present invention.

Exemplary embodiments of the present invention will hereinafter be described with reference to the drawings, in which like numerals represent like elements throughout the several figures. FIG. 1 illustrates an exemplary operating environment 100 for implementation of various exemplary embodiments of the present invention.

The exemplary operating environment 100 includes a general purpose computing device 120, which may be a conventional personal computer. The computing device 120 may include a processing unit 121, a system memory 122, and a system bus 123 that can couple various system components, including the system memory 122, to the processing unit 121. The system bus 123 may be any of several types of bus structures including a memory bus or memory controller, a peripheral bus, or a local bus using any of a variety of bus architectures. The system memory may include a read-only memory (ROM) 124 and a random access memory (RAM) 125. A basic input/output system (BIOS) 126, which may contain basic routines that help to transfer information between elements within computing device 120, such as during start-up, may be stored in ROM 124.

Computing device 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 may be connected to system bus 123 by a hard disk drive interface 132, a magnetic disk drive interface 133, and an optical disk drive interface 134, respectively.

Although the exemplary environment described herein employs a hard disk, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment 100. The drives and their associated computer readable media can provide nonvolatile storage of computer-executable instructions, data structures, program modules, and other data for computing device 120.

A number of program modules may be stored on hard disk 127, magnetic disk 129, optical disk 131, ROM 124, or RAM 125, including an operating system 135, a document application 136, which will be described in more detail below with respect to FIG. 2, and other applications 137, which may include any type of software application that can be executed by the computing device 120. Program modules can include, but are not limited to, routines, sub-routines, programs, objects, components, data structures, etc., which perform particular tasks or implement particular abstract data types.

A user may enter commands and information into computing device 120 through input devices, such as a keyboard 140 and a pointing device 142. Pointing devices may include a mouse, a trackball, or an electronic pen that can be used in conjunction with an electronic tablet. Other input devices (not shown) may include a microphone, joystick, game pad, satellite dish, scanner, or the like. These and other input devices are often connected to processing unit 121 through a serial port interface 146 that can be coupled to the system bus 123, but may be connected by other interfaces (not shown), such as a parallel port, game port, a universal serial bus (USB), or the like. A display device 147 may also be connected to system bus 123 via an interface, such as a video adapter 148. In addition to the display device 147, computing devices may include other peripheral output devices (not shown), such as speakers and printers.

The computing device 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the computing device 120, for simplicity, only a memory storage device 150 has been illustrated in FIG. 1. The logical connections depicted in FIG. 1 may include a local area network (LAN) 151 and a wide area network (WAN) 152. Such networking environments are commonplace in offices, enterprise-wide computer networks, intranets, and the Internet.

When used in a LAN networking environment, the computing device 120 is often connected to the local area network 151 through a network interface or adapter 153. When used in a WAN networking environment, the computing device 120 typically includes a modem 154 or other means for establishing communications over WAN 152, such as the Internet. Modem 154, which may be internal or external, can be connected to system bus 123 via serial port interface 146. In a networked environment, program modules depicted relative to computing device 120, or portions thereof, may be stored in the remote memory storage device 150. For example, the remote memory storage device 150 may store document application 136 and other applications 137 or portions thereof. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
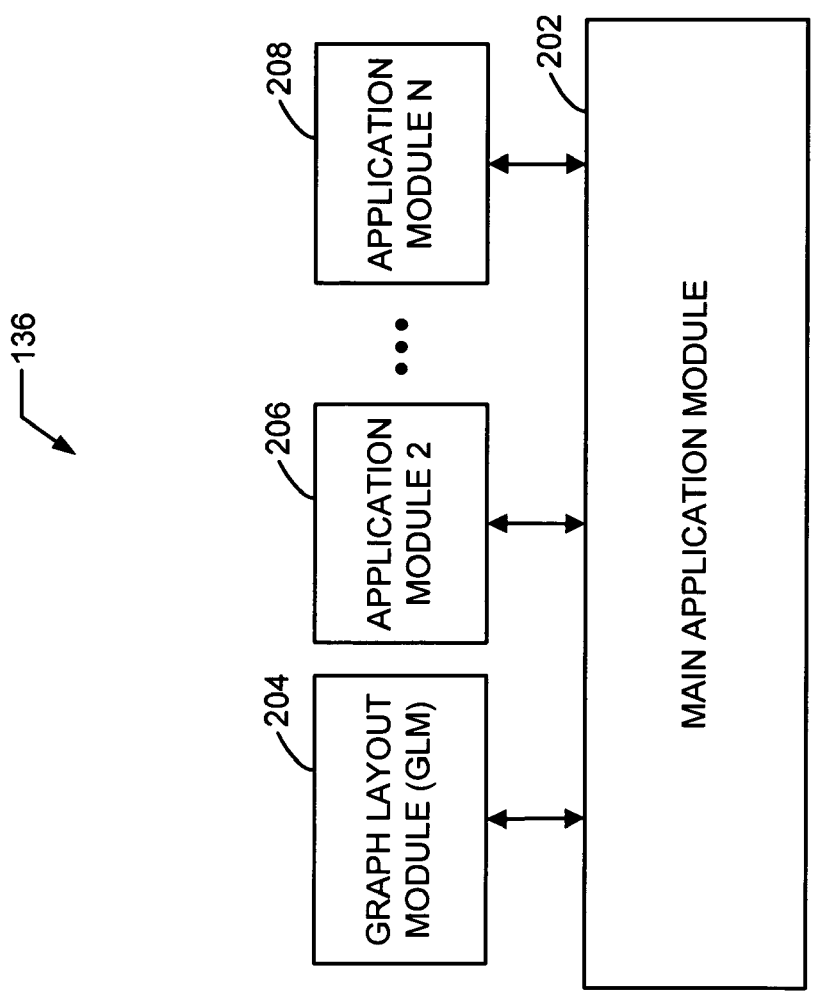
FIG. 2 is a block diagram illustrating a component architecture in accordance with various exemplary embodiments of the present invention.

Referring now to FIG. 2, a block diagram of a component architecture of the document application 136 (FIG. 1) is illustrated in accordance with various exemplary embodiments of the present invention. The document application 136 may be any software application that can be used to create and/or modify (edit, manipulate, etc.) a layout of connected nodes in a document (page, file, etc.) using, for example, a computing device 120 (FIG. 1). For example, the document application 136 may be configured to create and/or modify a connected node layout in a drawing, word processing document, spreadsheet, desktop publishing project, webpage, etc. Furthermore, a node may include any object that can be added to and/or modified in a document (or a display device, graphical user interface, etc.) such as, but not limited to, a graphical object, text, control, etc.

The exemplary document application architecture 136 can include a main application module 202. The main application module 202 may provide numerous functions and/or capabilities related to the document application 136 such as, but not limited to, creating, manipulating, viewing, or saving a document. The main application module 202 may also function to control or assist the functions of other modules 204, 206, 208 of the document application 136. Furthermore, the main application module 202 may function as an interface between other modules 204, 206, 208 of the document application 136 to facilitate their operation.

The exemplary document application architecture 136 can also include a graph layout module (GLM) 204. The graph layout module 204 can function to generate a compact layout of connected nodes in accordance with exemplary embodiments of the present invention. The graph layout module 204 may also provide other functions related to creating and/or modifying a layout of connected nodes. The exemplary document application architecture 136 can also include various other application modules, such as application modules 206, 208, which may provide various other functions related to the operation of the document application 136. Additional details of the functions and/or features of the graph layout module 204 of the exemplary document application architecture 136 will be described below with respect to FIGS. 3 through 11.

FIGS. 3 through 9 illustrate various diagrams of exemplary layouts of connected nodes in accordance with exemplary embodiments of the present invention. These exemplary layouts may be generated by the graph layout module 204 of the document application 136, which was described above. It should be understood that exemplary embodiments of the present invention are not limited to providing these exemplary layouts, and many other layouts of connected nodes may be provided in accordance with exemplary embodiments of the present invention, as will be apparent to those skilled in the art. Furthermore, it is noted that the exemplary layouts of connected nodes illustrated in FIGS. 3 through 9 may be described with terminology that is commonly used in the art to refer to components of connected node layouts and tree diagrams.

Figure 3:
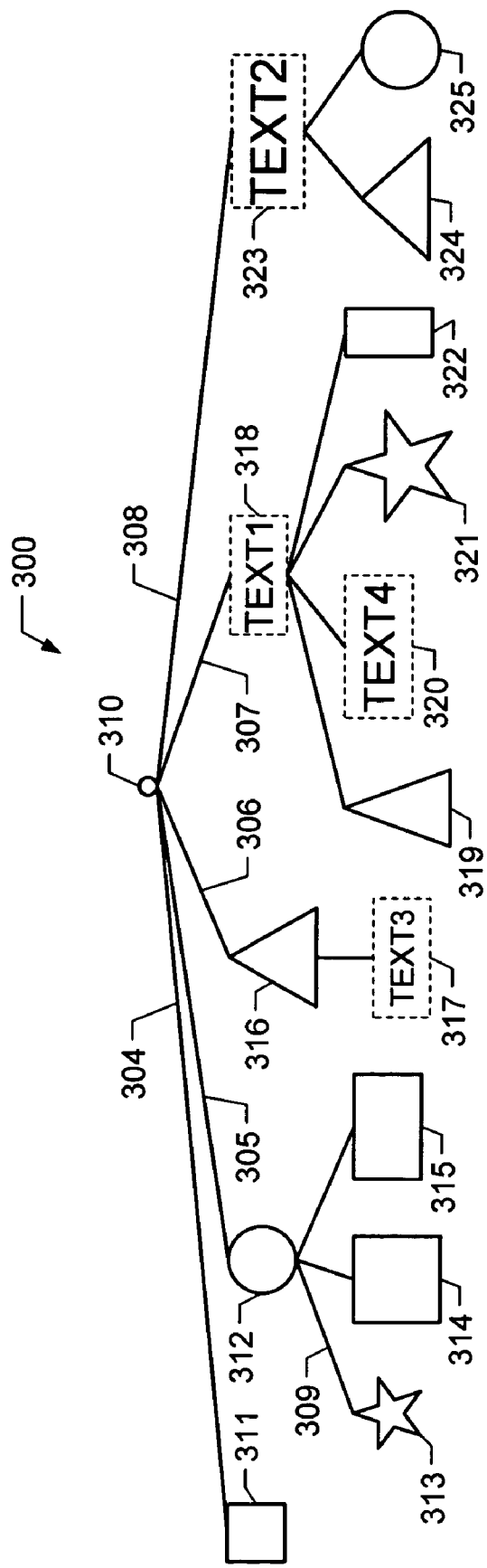
FIG. 3 is a diagram of a general topology of connected nodes in accordance with various exemplary embodiments of the present invention.

Referring now to FIG. 3, a diagram of a general topology (configuration, arrangement, etc.) 300 of connected nodes is illustrated. The connected nodes of the exemplary topology 300 are generally arranged in a tree layout. As discussed above, and applicable throughout the description of the exemplary embodiments of the present invention, a node may include any object that can be added to and/or modified in a document (display device, graphical user interface, etc.) such as, but not limited to, a graphical object, text, control, etc. Further, a node may have various characteristics of appearance and functionality, as will be apparent from the description of the exemplary embodiments of the present invention.

The exemplary topology 300 includes a root node 310. As known in the art, the root node 310 represents the highest node in a hierarchical configuration of connected nodes. Thus, the root node 310 may be connected to one or more nodes of a lower hierarchical level (rank, position, etc.), but no nodes of a higher hierarchical level are connected to it. In the exemplary topology 300, the root node 310 is connected to several nodes 311, 312, 316, 318, 323, which are commonly referred to in the art as the child nodes or children of the root node 310. Furthermore, the root node 310 may be referred to as a parent node or parent of each of its child nodes 311, 312, 316, 318, 323.

The root node 310 is connected to each of its child nodes 311, 312, 316, 318, 323 by a connector that is commonly referred to as an edge or branch. Thus, the root node 310 is connected to the child node 311 by edge 304, to child node 312 by edge 305, to child node 316 by edge 306, and so on, as illustrated in FIG. 3. As also illustrated in FIG. 3, other nodes are connected to the child nodes 311, 312, 316, 318, 323 by other edges, as discussed below. One or more series of edges that lead from one node to another node are commonly known as a path. Thus, edge 304 is a path from root node 310 to child node 311. Similarly the series connection of edge 305 to edge 309 is a path from root node 310 to child node 313.

Some of the child nodes 311, 312, 316, 318, 323 of the root node 310 have their own child nodes connected to them. For example, child node 312 has its own child nodes 313, 314, 315 connected to it and it is a parent node 312 with respect to these nodes 313, 314, 315. Similarly, child node 316 is also a parent node of child node 317, child node 318 is also a parent node of child nodes 319, 320, 321, 322, and child node 323 is also a parent node of child nodes 324, 325. Typically, two or more child nodes of the same parent node are referred to in the art as sibling nodes or siblings. Thus, nodes 311, 312, 316, 318, 323 and nodes 313-315 are each examples of sibling nodes.

Since nodes 312, 316, 318, 323 include a parent node (i.e., the root node 310), and at least one child node (i.e., nodes 313-315, 317, 319-322, 324-325, respectively), these nodes 312, 316, 318, 323 may be referred to in the art as internal nodes. Furthermore, any child node ultimately connected to a parent node may be referred to in the art as a descendant node or descendant of the parent node. For example, child nodes 312, 313-315 are each a descendant node (collectively, descendant nodes or descendants) of the root (parent) node 310. Additionally, any parent node that is ultimately connected to a child node may be referred to in the art as an ancestor node or ancestor of the child node. Thus, root (parent) node 310 and parent node 312 are each an ancestor node (collectively, ancestor nodes or ancestors) of child nodes 313-315.

As known in the art, the term sub-tree is commonly used to refer to a parent node and all of its descendant nodes (if any). For example, nodes 312, 313, 314, may be referred to as a sub-tree of node 312. As another example, nodes 316 and 317 may be referred to as a sub-tree of node 316. As yet another example, nodes 318, 319, 320, 321, and 322 may be referred to as a sub-tree of node 318.

In contrast to the root node 310, a node that is connected to a node of a higher hierarchical level in the exemplary topology 300 but not to any nodes of a lower hierarchical level is commonly referred to as a leaf node or leaf. In other words, a leaf node does not have any child nodes connected to it Thus nodes 311, 313-315, 317, 319-322, 324-325 are each examples of leaf nodes, since they have no lower level (or child) nodes connected to them.

As will be discussed below with respect to FIG. 10, the exemplary general topology 300 is one example for representing a hierarchical topology that can be arranged into a compact layout in accordance with exemplary embodiments of the present invention. Thus, although the exemplary general topology 300 is arranged in a tree layout, it could also be arranged in other layouts that can be processed to provide a compact layout of connected nodes in accordance with exemplary embodiments of the present invention. Furthermore, the nodes of the exemplary topology 300 include various characteristics, such as different shapes and object types (i.e., graphics, text, etc.), to emphasize that the nodes may be any object that can be added to and/or modified in a document (display device, graphical user interface, etc.) without limitation.

Figure 4:
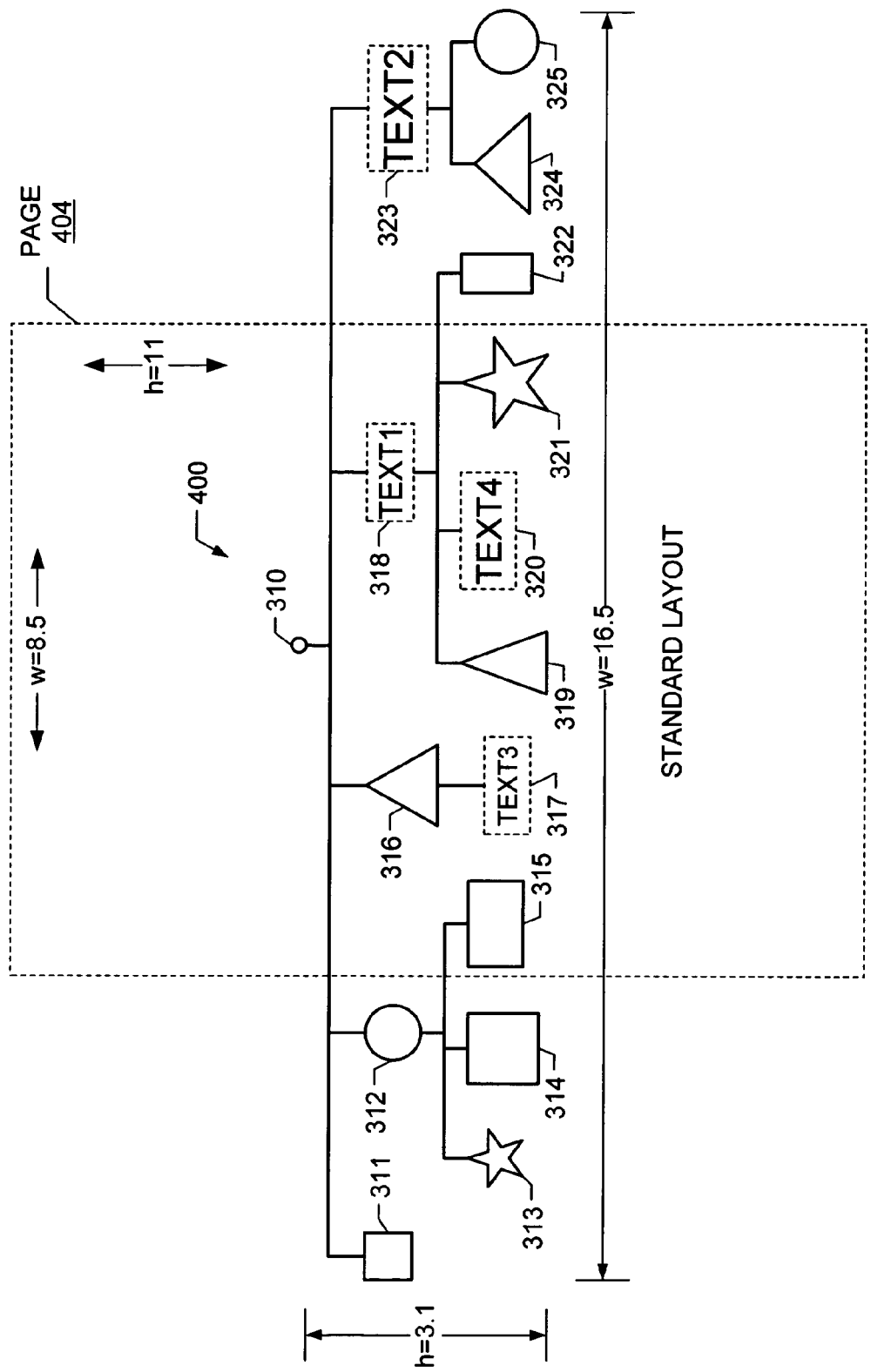
FIG. 4 is a diagram of a standard layout of the connected nodes introduced in FIG. 3 in accordance with various exemplary embodiments of the present invention.

FIG. 4 is a diagram of an exemplary standard layout 400 of the general topology 300 of connected nodes illustrated in FIG. 3. The exemplary standard layout 400 is also generally arranged into a tree layout which may be referred to in the art as a layered tree drawing or graph drawing. For simplicity, the arrangement of the standard layout 400 will be referred to hereafter as a "layered tree layout." In addition to the tree layout 300 illustrated in FIG. 3, the layered tree layout 400 is a typical layout format to present a hierarchical arrangement of connected nodes. Since the exemplary standard layout 400 is based on the exemplary general topology 300, the layout 400 includes all of the nodes 310-322 discussed above with respect to FIG. 3.

As is typical of a layered tree layout, the exemplary standard layout 400 includes the arrangement of all nodes of the same hierarchical level in a row at the same vertical level in the layout 400 (alternatively, for example, such nodes may be arranged in a column at the same horizontal level of a layered tree layout). Thus, nodes 311, 312, 316, 318, 323, which are child nodes of root node 310 and also sibling nodes of each other, are all arranged in a row at the same vertical level. Similarly, nodes 313-315, 317, 319-322, 324-325, which are leaf nodes and also grandchildren (as sometimes referred to in the art) of root node 310, are all arranged in a row below the row level of their parent nodes 311, 312, 316, 318, 323, respectively.

As a result of this layout design, layered tree layouts that include more than a few connected nodes typically produce layouts that are much larger in width than height. For example, as depicted in FIG. 4, the exemplary standard layout 400 has an approximate width of 16.5 units, but an approximate height of only 3.1 units, where units may be any possible unit of dimension for measurement purposes, such as inches, centimeters, etc. Thus, a layered tree layout 400 with more than a few connected nodes is typically very wide. In contrast, a typical page 404 has much more proportionate dimensions, for example 8.5 units in width by 11 units in height (which is analogous to a standard letter sized paper dimension). As a result, a typical layered tree layout 400 usually cannot be printed on a single standard sized sheet of paper (regardless of its orientation) and must instead be appended to several sheets, which typically makes it difficult to present or analyze the layout. Additionally, the layered tree layout 400 is also typically too wide or otherwise dimensionally disproportionate to view on a computer monitor or similar device without the need to scroll around the layout or reduce the viewing size to a level that is impractical for analysis or presentation.

Figure 5:
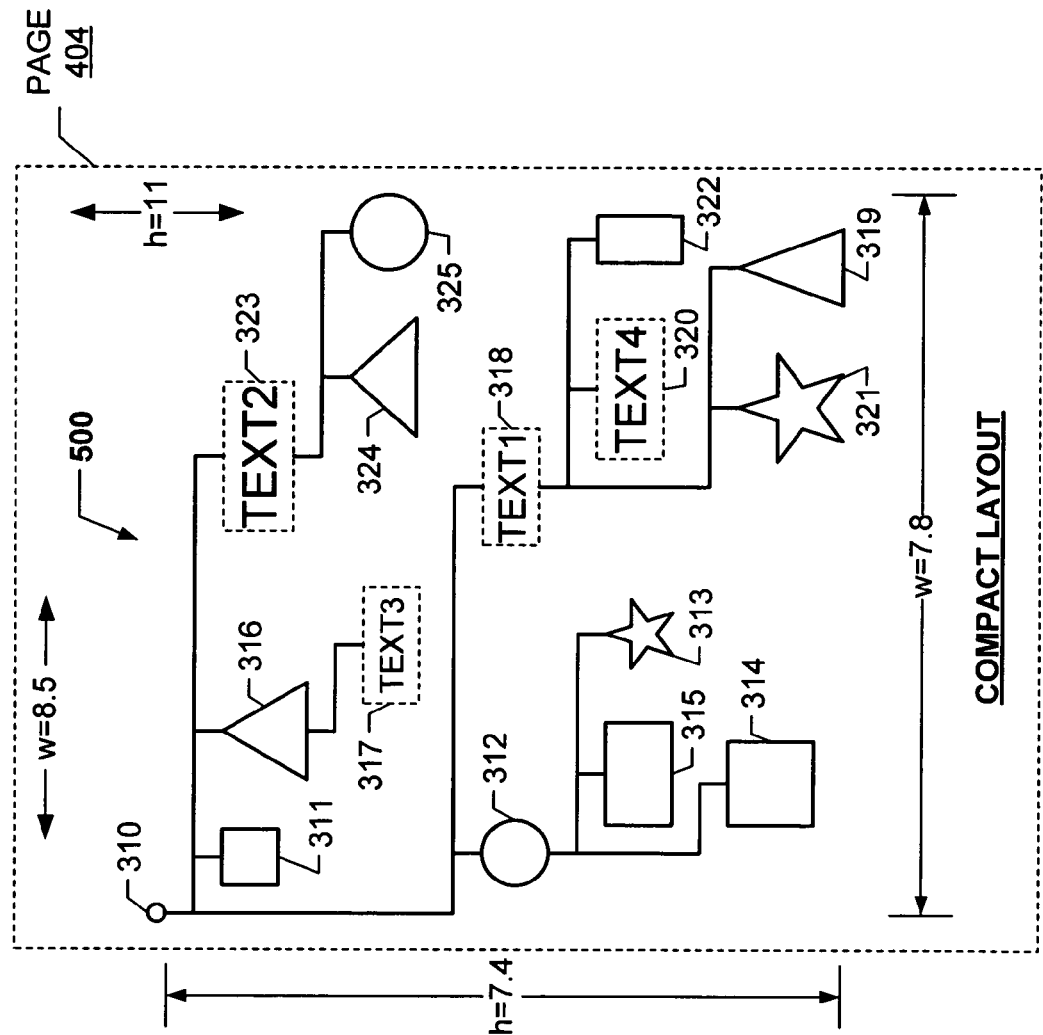
FIG. 5 is a diagram of a compact layout of the connected nodes introduced in FIG. 3 in accordance with various exemplary embodiments of the present invention.

Turning now to FIG. 5, a diagram is shown of a compact layout 500 of the general topology 300 of connected nodes illustrated in FIG. 3 in accordance with exemplary embodiments of the present invention. The exemplary compact layout 500 includes all of the nodes 310-322 that were introduced in the general topology 300 of FIG. 3. However, in significant contrast to the exemplary tree layout 300 and the exemplary layered tree layout 400, the exemplary compact layout 500 has overall dimensions that are much more proportional. That is, the width of the compact layout 500 is almost equivalent to the height of the layout 500.

As depicted in FIG. 5, the compact layout 500 has an approximate width of 7.8 units and an approximate height of 7.4 units. Thus, there is almost no difference between the value of the width and the height of the compact layout 500. In other words, the aspect ratio of the compact layout 500, which is the ratio of the width to the height (i.e. width/height), is almost 1.0 (the aspect ratio could alternately be defined as the ratio of the height to the width). As a result of this exemplary characteristic of compact layouts of connected nodes in accordance with exemplary embodiments of the present invention, the exemplary compact layout 500 is able to be printed on a single sheet of standard sized paper, such as the page 404. Furthermore, the compact layout 500 is more likely to be viewable on a computer monitor or similar device without the need to scroll or impractically zoom out the layout 500.

It is noted that although the compact layout 500 has more proportional dimensions than typical layouts, such as a tree layout 300 or layered tree layout 400, the compact layout 500 still represents the same hierarchical organization as the other layouts 300, 400. For example, the child nodes 311, 312, 316, 318, 323 of the root node 310 can be identified since they are each connected to the root node 310 by a single edge in between them. Similarly, the hierarchy of the nodes in the sub-trees of the compact layout 500 is also apparent from the connection of the child nodes to the respective parent nodes, despite the positioning of some of the child nodes on different vertical levels with respect to the parent nodes.

Exemplary transitions of the general topology 300 to the compact layout 500 will be discussed below with respect to FIGS. 6A-6E. Exemplary applications and variations of the compact layout 500 will be discussed below with respect to FIGS. 7-9. Finally, exemplary processes for arranging connected nodes into a compact layout 500, for example, based on a general topology 300 of connected nodes, will be discussed below with respect to FIGS. 10-11.

Figure 6A:
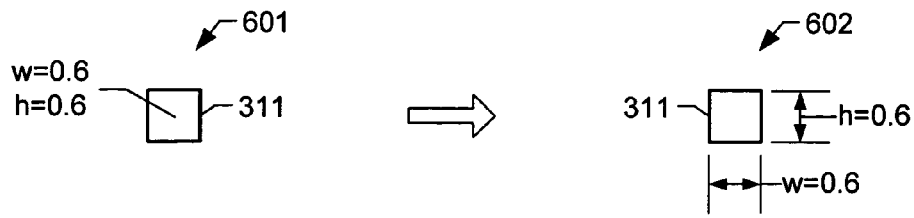
FIGS. 6A-6E are diagrams showing portions of the connected nodes introduced in FIG. 3 transitioning from the general topology of FIG. 3 to the compact layout of FIG. 5 in accordance with various exemplary embodiments of the present invention.

FIGS. 6A-6E illustrate exemplary portions of connected nodes transitioning from the exemplary general topology 300 of FIG. 3 to the exemplary compact layout 500 of FIG. 5 in accordance with exemplary embodiments of the present invention. In FIG. 6A, the child/leaf node 601 (311) of root node 310 is illustrated. As depicted, the node 601 (311) has an approximate dimension of 0.6 units in width by 0.6 units in height. Since the node 601 is a leaf node and it has no sibling nodes, the node 601 transitions to a node 602 with the same dimensions. As will be discussed below for FIGS. 10-11, these dimensions can be used in the process of arranging the node 602 into a compact layout with the other connected nodes and/or sub-trees.

Figure 6B:
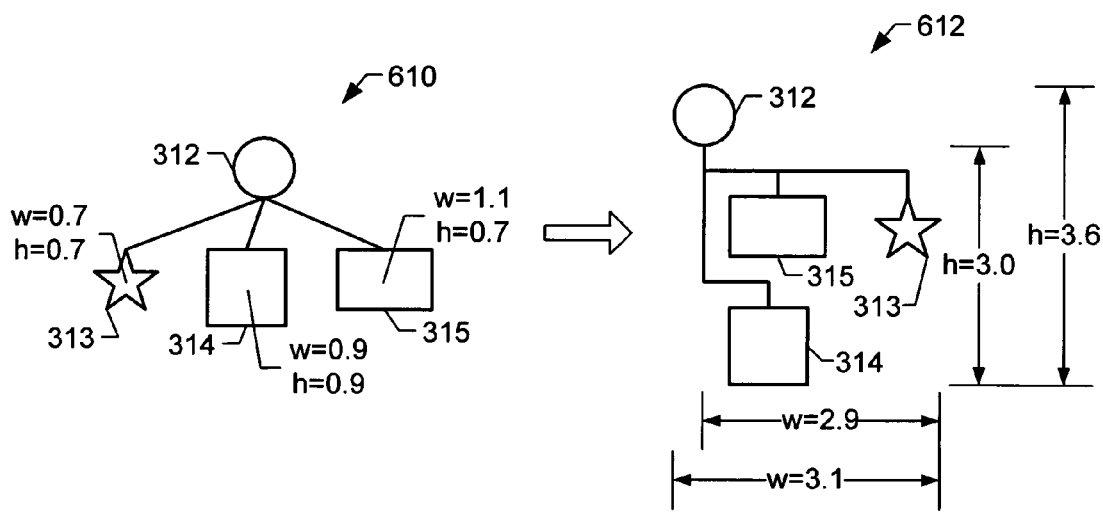
Figure 6C:
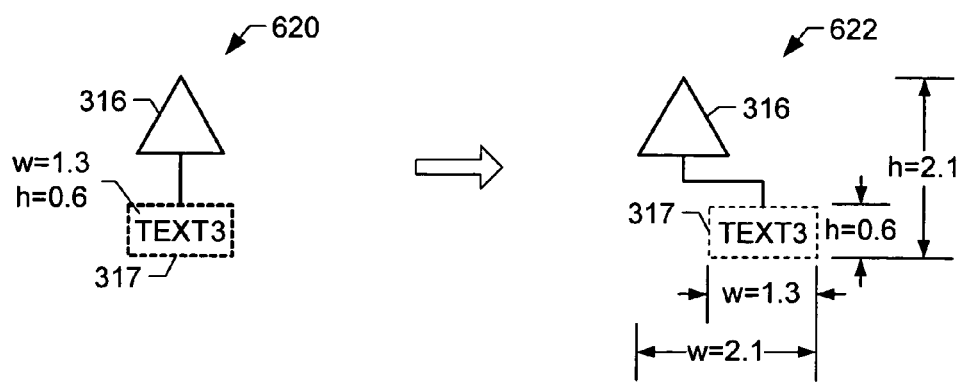

FIG. 6B illustrates a sub-tree 610, which includes parent node 312 and child nodes 313-315 of the general topology layout 300 discussed above for FIG. 3. The dimensions for each of the child nodes 313-315 are also listed for the sub-tree 610. In that regard, it is noted that the dimensions for individual nodes, as well as overall sub-trees or layouts, are typically based on the dimensions of a rectangular box that can bound the edges of the node, sub-tree, or layout (commonly referred to as a bounding box). However, the dimensions may be based on other measurements and/or characteristics of the node (sub-tree, layout, etc.) within the scope of exemplary embodiments of the present invention.

The sub-tree 612 is a transition of the connected nodes of the sub-tree 610 to a compact layout. In that regard, it is noted that the aspect ratio of the collective arrangement of the child nodes 313-315 is approximately 2.9 units to 3.0 units or 0.97, which is much closer to 1.0 than the aspect ratio of the same child nodes 313-315 in the tree layout of the sub-tree 610. Furthermore, the aspect ratio of the overall sub-tree 612 is approximately 3.1 units to 3.6 units or 0.86. The overall dimensions of the sub-tree 612 can be used in the process of arranging the nodes 312-315 into a compact layout with the other connected nodes and/or sub-trees, as will be discussed below for FIGS. 10-11.

Similar to the foregoing discussion of the transitions illustrated in FIGS. 6A-6B, FIGS. 6C-6E illustrate transitions of sub-trees 620, 630, 640, which are arranged in a tree layout, to sub-trees 622, 632, 642, respectively, which are arranged in a compact layout in accordance with exemplary embodiments of the present invention. Furthermore, dimensions related to each set of the sub-trees 620, 630, 640 and 622, 632, 642 are also illustrated. The relevance of these dimensions and exemplary processes to obtain the exemplary transitions illustrated in FIGS. 6C-6E will be discussed in more detail below with respect to FIGS. 10-11.

Figure 7:
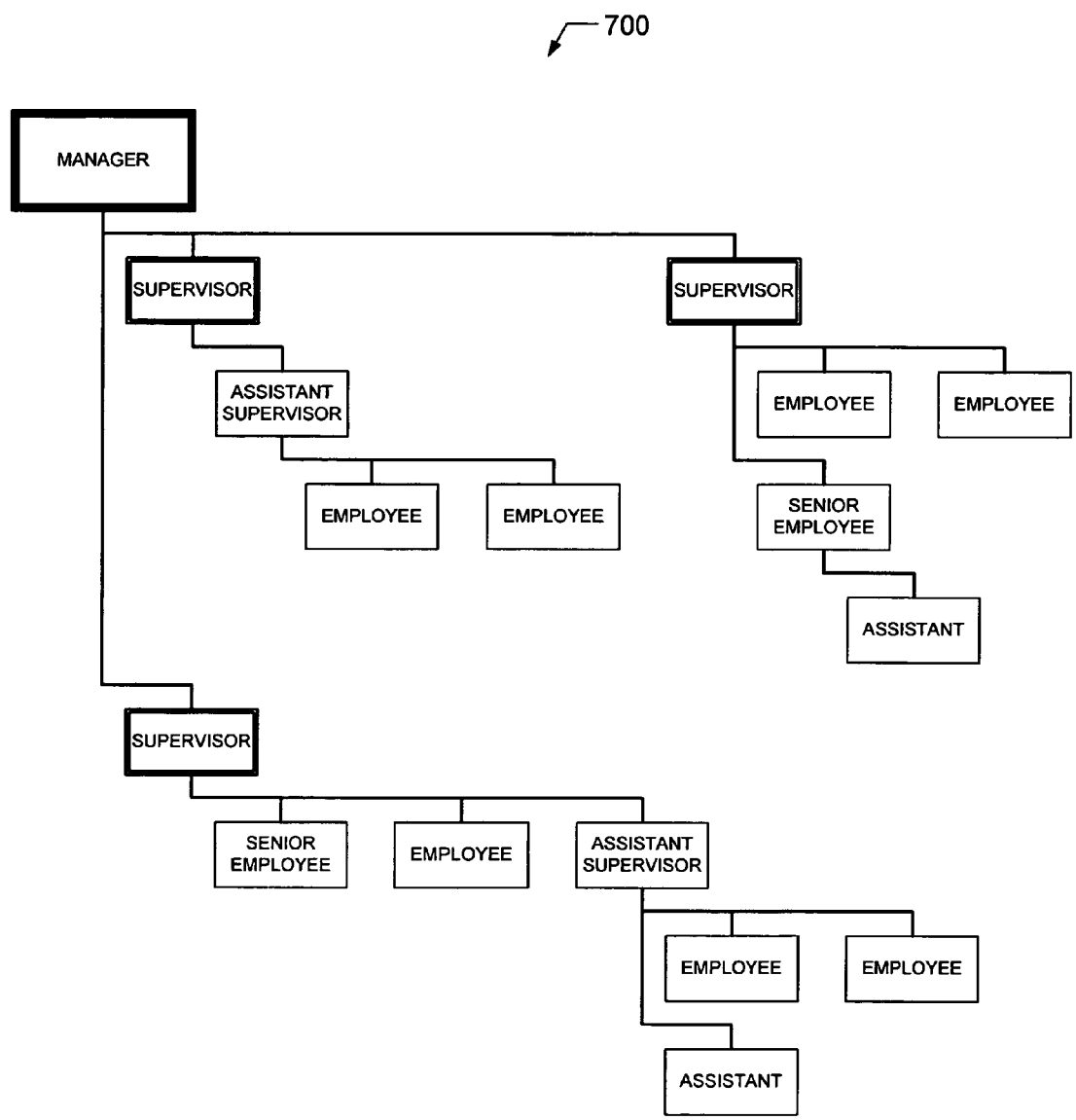
FIG. 7 is a diagram of a compact layout of connected nodes forming an exemplary organizational chart in accordance with various exemplary embodiments of the present invention.

Moving on to FIG. 7, a compact layout of connected nodes forming an exemplary organizational chart 700 is illustrated in accordance with exemplary embodiments of the present invention. The exemplary organization chart 700 includes multiple connected nodes that indicate an exemplary hierarchy of various employment positions, for example, in a business. In compact format, the exemplary organization chart 700 can be arranged on a standard sized sheet of paper and conveniently viewed on a typical computer monitor. In contrast, if the exemplary organizational chart 700 were arranged in a tree layout or layered tree layout (as discussed above for FIGS. 3 and 4, respectively), the chart 700 would be too wide to be printed or viewed in such manner.

Figure 8:
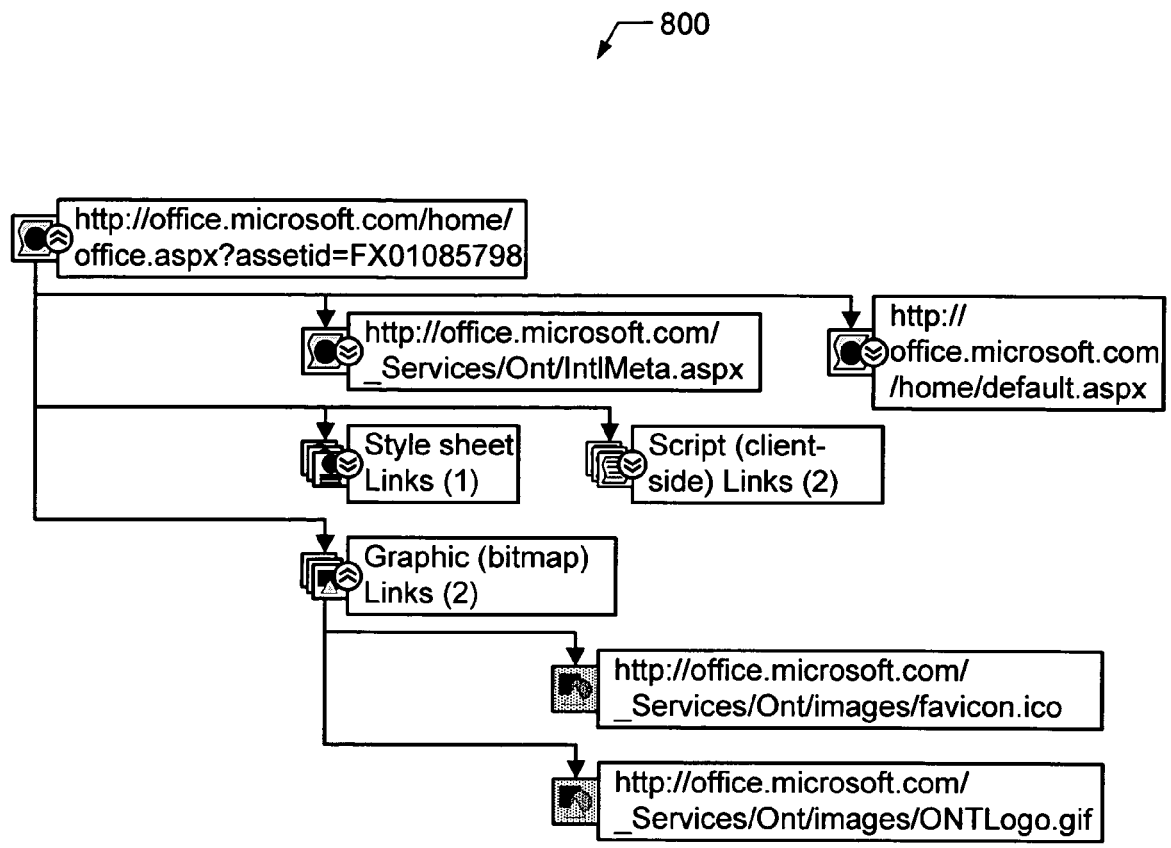
FIG. 8 is a diagram of a compact layout of connected nodes forming an Internet web diagram in accordance with various exemplary embodiments of the present invention.

FIG. 8 illustrates a compact layout of connected nodes forming an Internet web diagram 800 in accordance with exemplary embodiments of the present invention. Similar to organization charts, Internet web diagrams are yet another form of connected node layouts that are enhanced by arranging them in compact layout formats according to exemplary embodiments of the present invention. As shown in the exemplary web diagram 800, the connected nodes can be used to represent the hierarchical organization of links on an Internet web site. Since Internet web sites typically include numerous links, arranging Internet web diagrams in a compact layout can provide a layout that is more convenient to analyze and present, since the dimensions of the web diagram are typically much more proportional (e.g., approaching an aspect ratio of 1.0) when arranged in a compact layout format. The connected nodes in the Internet web diagram 800 also exemplify the various possible types and characteristics of nodes that can be arranged in a compact layout in accordance with exemplary embodiments of the present invention. For example, the exemplary web diagram 800 includes nodes with text and graphics, and the nodes may also function as a control that can be selected to access remote data or view content of an Internet web page.

Figure 9:
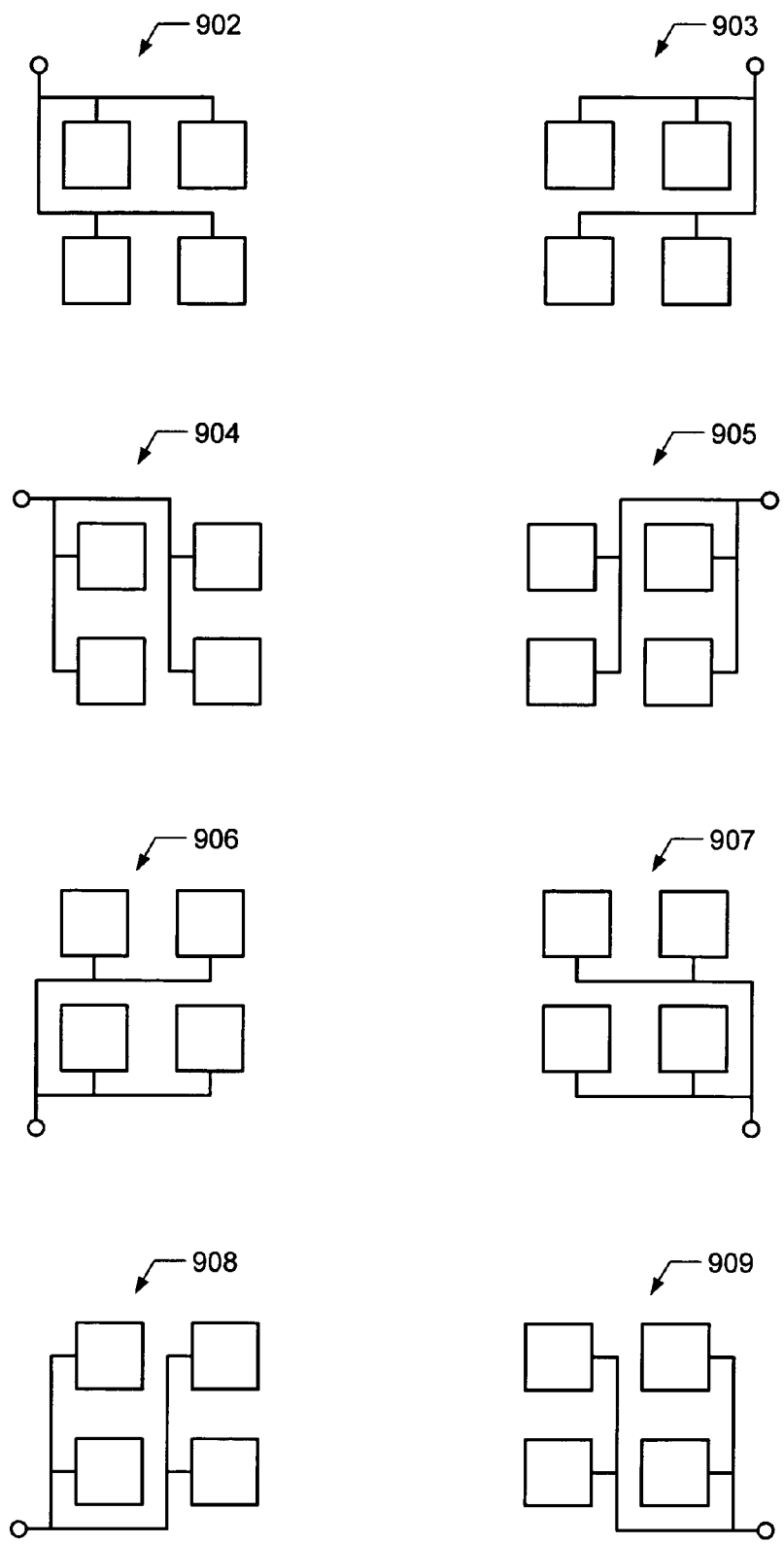
FIG. 9 is a diagram of exemplary compact layout formats in accordance with various exemplary embodiments of the present invention.

Turning to FIG. 9, various exemplary compact layout formats 902-909 are illustrated in accordance with exemplary embodiments of the present invention. These exemplary compact layout formats 902-909 illustrate examples of possible orientations of nodes and edges (branches, connectors, etc.) when arranged in a compact layout. It should be understood that other compact layout formats can be obtained in accordance with various exemplary embodiments of the present invention, as will be apparent those skilled in the art. Exemplary compact layout formats 902 and 903 illustrate a so-called down-then-right and a down-then-left compact layout format, respectively. Exemplary compact layouts 904 and 905 illustrate a right-then-down and a left-then-down compact layout format, respectively. An up-then-right and up-then-left compact layout format are illustrated by the exemplary layouts 906 and 907, respectively. Finally, a right-then-up and a left-then-up compact layout format are illustrated respectively by exemplary compact layouts 908 and 909.

Focusing now on FIGS. 10 and 11, it is first noted that in the following discussion of exemplary processes according to exemplary embodiments of the present invention, references may be made to elements of FIGS. 1 through 9 as applicable to facilitate the description of exemplary aspects and embodiments of the present invention. However, it should be understood that such references are exemplary and not limiting with respect to the scope of the exemplary embodiments of the present invention. With respect to exemplary processes that are described below and elsewhere, certain steps of these processes may naturally precede others for the exemplary embodiments of the present invention to function as described. However, exemplary embodiments of the present invention are not limited to the order of the steps described, for example, if a different order or sequence can be executed without altering the intended functionality of the exemplary processes. That is, it is recognized that some steps of the exemplary processes described herein may be performed before or after other steps, or in parallel or combination with other steps, without departing from the scope of the exemplary embodiments of the present invention.

Figure 10:
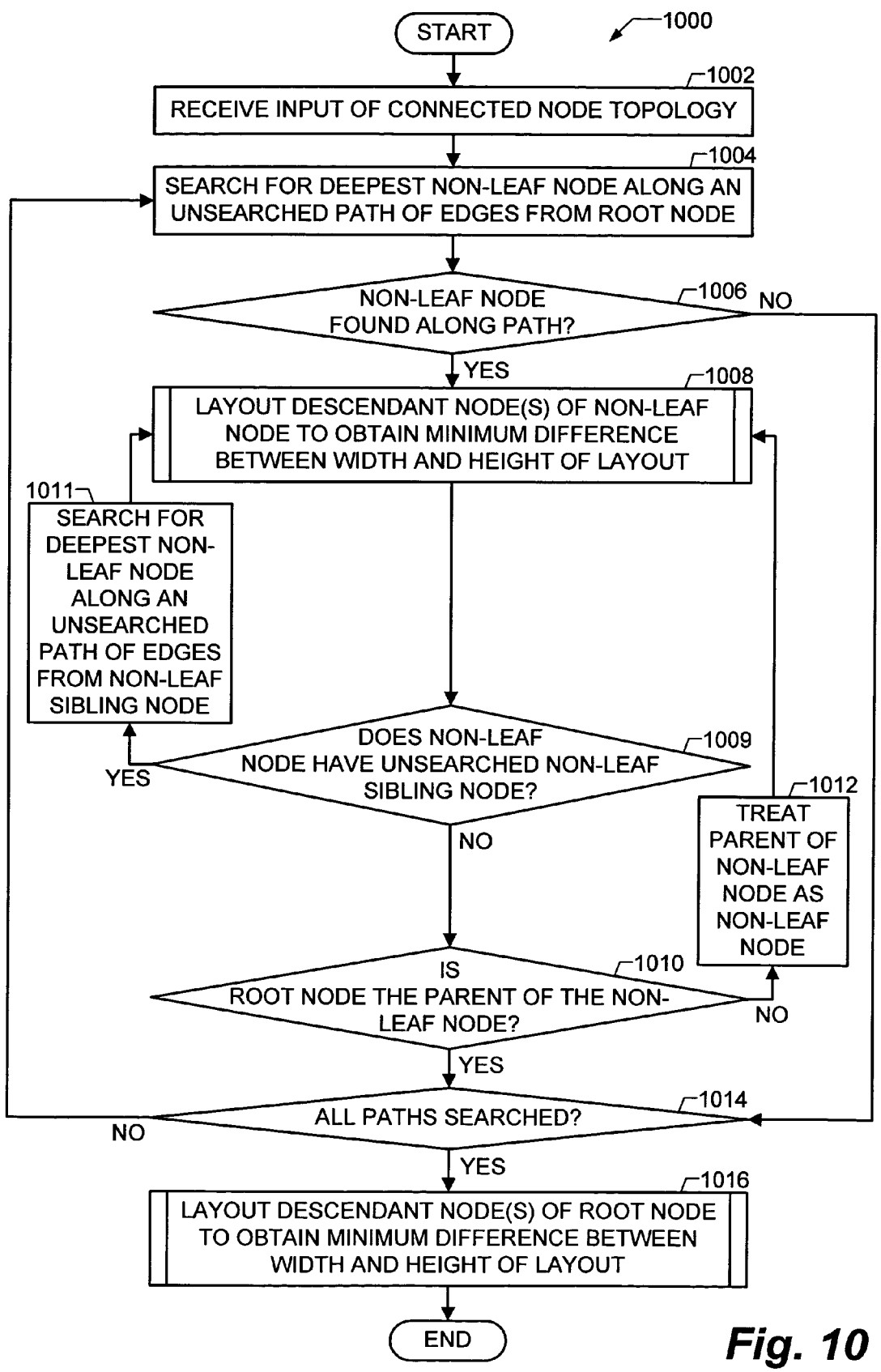
FIG. 10 is a logic flow diagram illustrating a process for arranging connected nodes into a compact layout having a proportionate width and height in accordance with various exemplary embodiments of the present invention.

In that regard, reference is now made to FIG. 10, which presents a logic flow diagram of an exemplary process 1000 for arranging connected nodes into a compact layout having a proportionate width and height. The exemplary process 1000 starts with step 1002 in which an input of a connected node topology is received, for example, by the graph layout module 204 (discussed above for FIG. 2). For example, an input may be received that represents the general topology 300 of connected nodes shown in FIG. 3.

The input of a connected node topology may be received in step 1002 in various formats, which may be known in the art. For example, the input may be received as a data structure that represents the various nodes and edges that form the connected node topology. As another example, the input may be received as a graph or table of data representing the topology of nodes and edges. In accordance with some exemplary embodiments of the present invention, the connected node topology input may be organized into a tree layout format in step 1002 from other formats (which may include removing cycles from the topology, as is known in the art) for further processing according to the exemplary process 1000.

Other information may also be received with the input in step 1002, such as the preferred page size for the layout of the connected node topology or the preferred format of the layout. For example, a selection of one of the exemplary compact layout formats 902-909 discussed above for FIG. 9 may be included as part of the input. Furthermore, layout preferences such as the preferred spacing of nodes and edges within the layout may also be input. These and other input settings may affect the process 1000 and the resulting compact layout of connected nodes.

The exemplary process 1000 continues with step 1004 in which a search of the connected node topology received in step 1002 is made for the deepest non-leaf node (i.e., internal node) along an unsearched path of edges from the root node of the topology. This step 1004 may be implemented, for example, by the graph layout module 204. For example, referring to the exemplary general topology 300, a search can be made in step 1004 from the root node 310 along each edge 304-307 to find the deepest (i.e., following the most number of edges in a path) non-leaf node along each path which includes the edges 304-307, respectively. Thus, the search in step 1004 can proceed along the path from the root node 310 via edge 304, in which case no non-leaf node is located, since there is only the leaf node 311 along that path. However, the search step can also proceed along the path from the root node 310 via edge 305, in which case the deepest non-leaf node 312 is located, since all of the child (or descendant) nodes 313-315 of non-leaf node 312 are leaf nodes (i.e., they have no connected child nodes).

From step 1004, the exemplary process moves on to decision step 1006 in which it is determined whether a non-leaf node is located along the path searched in step 1004. This determination may be executed by the graph layout module 204. If a non-leaf node is found as a result of the search along a path in step 1004, the exemplary process 1000 proceeds along the "yes" branch from decision step 1006 to routine step 1008 (discussed below). However, if a non-leaf node is not found during the search along the path, the exemplary process 1000 proceeds along the "no" branch to decision step 1014 (discussed below).

As discussed above the exemplary process may proceed from decision step 1006 to routine step 1008 if a non-leaf node is located. In routine step 1008, the descendant node(s) of the non-leaf node are laid out (arranged, positioned, etc.) to obtain a minimum in the difference between the width and height of the layout (throughout this discussion, this may be an absolute value of the difference between the two dimensions). In other words, the descendant node(s) of the non-leaf node are arranged in a compact layout, which may be conducted by the graph layout module 204. Referring for example to FIG. 6B, in routine step 1008, the descendant nodes 313-315 of non-leaf node 312 are transitioned from the exemplary tree layout 610 to the compact layout 612. In compact layout 612, the difference between the width and the height of the layout of the descendant nodes 313-315 is approximately 0.1 units (i.e., 3.0–2.9), which can be a minimum obtainable difference in the dimensions of the layout. Various arrangements of the nodes may be possible to obtain a compact layout in routine step 1008, as will be apparent to those skilled in the art. An exemplary sub-process for implementing routine step 1008 will be discussed below with respect to FIG. 11.

The exemplary process 1000 proceeds from routine step 1008 to decision step 1009 in which a determination is made, for example by the graph layout module 204, whether the non-leaf node, whose descendant node(s) were processed in routine step 1008, has an unsearched non-leaf sibling node. For example, in the case of the non-leaf node 312 of the exemplary general topology 300, node 316 is an unsearched non-leaf sibling node of non-leaf node 312. If it is determined in decision step 1009 that the non-leaf node has an unsearched non-leaf sibling node, the exemplary process 1000 proceeds along the "yes" branch to decision step 1011 (discussed below). However, if it is determined in decision step 1009 that the non-leaf node does not have an unsearched non-leaf sibling node, the exemplary process 1000 proceeds along the "no" branch to decision step 1010 (discussed below).

If it is determined that the non-leaf node has an unsearched non-leaf sibling node in decision step 1009, the exemplary process 1000 proceeds to step 1011. In step 1011, a search is performed, for example by the graph layout module 204, for the deepest non-leaf node along an unsearched path of edges from the non-leaf sibling node. For example, in the case of the non-leaf sibling node 316, a search according to step 1011 results in the non-leaf sibling node 316 being identified as the deepest non-leaf node along the unsearched path of edges since the sibling node 316 only has a descendant (or child) node 317, which is a leaf node. Therefore, the non-sibling node 316 is identified as the new non-leaf node as a result of step 1011. The exemplary process 1000 proceeds from step 1011 back to routine step 1008 (discussed above) in which the descendant node(s) of the new non-leaf node are arranged into a compact layout.

As discussed above, if it is determined that the non-leaf node does not have a non-leaf sibling node, the exemplary process 1000 proceeds from decision step 1009 to decision step 1010. In decision step 1010, a determination is made, for example by the graph layout module 204, whether the root node of the connected node topology is the parent of the non-leaf node whose descendant node(s) were processed in routine step 1008. For example, in the case of the non-leaf node 312 of the exemplary general topology 300, the root node 310 is the parent of the non-leaf node 312. If it is determined in decision step 1010 that the root node is the parent of the non-leaf node, the exemplary process 1000 proceeds along the "yes" branch to decision step 1014 (discussed below). However, if it is determined in decision step 1010 that the root node is not the parent of the non-leaf node, the exemplary process 1000 proceeds along the "no" branch to step 1012 (discussed below).

The exemplary process 1000 proceeds to step 1012 if it is determined in decision step 1010 that the root node is not the parent of the non-leaf node whose descendant node(s) were processed in routine step 1008. In step 1012, the parent of the non-leaf node is now treated (for example by the graph layout module 204) as if it is the non-leaf node for the purpose of further processing of the connected node topology in the exemplary process 1000. Thus, the sub-tree formed by the originally located non-leaf node and its descendant node(s) is now processed as the descendant node(s) of the new non-leaf node. For example, if the parent of non-leaf node 312 of the exemplary topology 300 was a node, other than the root node 310, this hypothetical node could be treated as the non-leaf node and the sub-tree nodes 312-315 could be processed as the descendant nodes of this hypothetical node according to step 1012. The exemplary process 1000 proceeds from step 1012 back to routine step 1008 (discussed above) in which the descendant node(s) of the new non-leaf node are arranged in a compact layout.

As discussed above, the exemplary process 1000 proceeds from decision step 1010 to decision step 1014 if it is determined in decision step 1010 that the root node is the parent of the non-leaf node whose descendant node(s) were processed in routine step 1008. In decision step 1014, it is determined, for example by the graph layout module 204, whether all paths in the connected node topology have been searched. If it is determined that all paths in the connected node topology have been searched, the exemplary process proceeds along the "yes" branch to routine step 1016 (discussed below). Alternately, if it is determined in decision step 1014 that all paths in the connected node topology have not been search, the exemplary process 1000 proceeds along the "no" branch back to step 1004 (discussed above) in which another search is executed for the deepest non-leaf node along an unsearched path of edges from the root node.

The exemplary process 1000 can conclude with routine step 1016 if it is determined in decision step 1014 that all paths of the connected node topology have been searched. In routine step 1016, the descendant nodes of the root node of the connected node topology are arranged to obtain a minimum difference between the width and the height of the layout of descendant nodes. In other words, the descendant nodes of the root node are arranged in a compact layout, which may be performed by the graph layout module 204. As discussed above for step 1012, it should be understood with respect to routine step 1016 that the descendant nodes of the root node may include sub-trees that have been previously arranged into compact layouts in routine step 1008. For example, the final transition of the exemplary tree layout topology 300 of FIG. 3 to the exemplary compact layout 500 of FIG. 5 may be obtained by routine step 1016. As noted for routine step 1008, it will apparent to those skilled in the art that various arrangements of the nodes and/or sub-trees of the root node may be available to obtain a compact layout in routine step 1016. Thus, the compact layout 500 is just an example of the possible compact layout arrangements that may result from the exemplary process 1000. An exemplary sub-process for implementing routine step 1016 will be discussed below with respect to FIG. 11.

With respect to the above described exemplary process 1000, it is noted that the process 1000 may be a repetitive or recursive process performed on a connected node topology. For example, steps 1004 through 1014 may be repeated as the non-leaf nodes along each path from the root node are located and the respective descendant nodes and/or sub-trees are arranged into a compact layout, which are all ultimately arranged into a compact layout with respect to the root node in routine step 1016. Thus, the exemplary process 1000, or portions of it (such as steps 1004 through 1014), may be viewed as a depth-first recursive algorithm that arranges the descendant node(s) of every non-leaf node of a connected node topology (such as the general topology 300) into a compact layout. However, it should be understood that the exemplary process 1000 (or portions of it) is not limited to a repetitive or recursive implementation in accordance with exemplary embodiments of the present invention.

It is also noted that although the above steps of the exemplary process 1000 are described as being executed by the graph layout module 204, additional and/or other modules, such as the modules 202, 206, 208, may execute various steps of the process 1000. Moreover, although the exemplary process 1000 is described with respect to a hierarchical connected node topology, other types of topologies may also be processed for arrangement into a compact layout, such as arbitrary data structures which include multiple-parent nodes.

Figure 11:
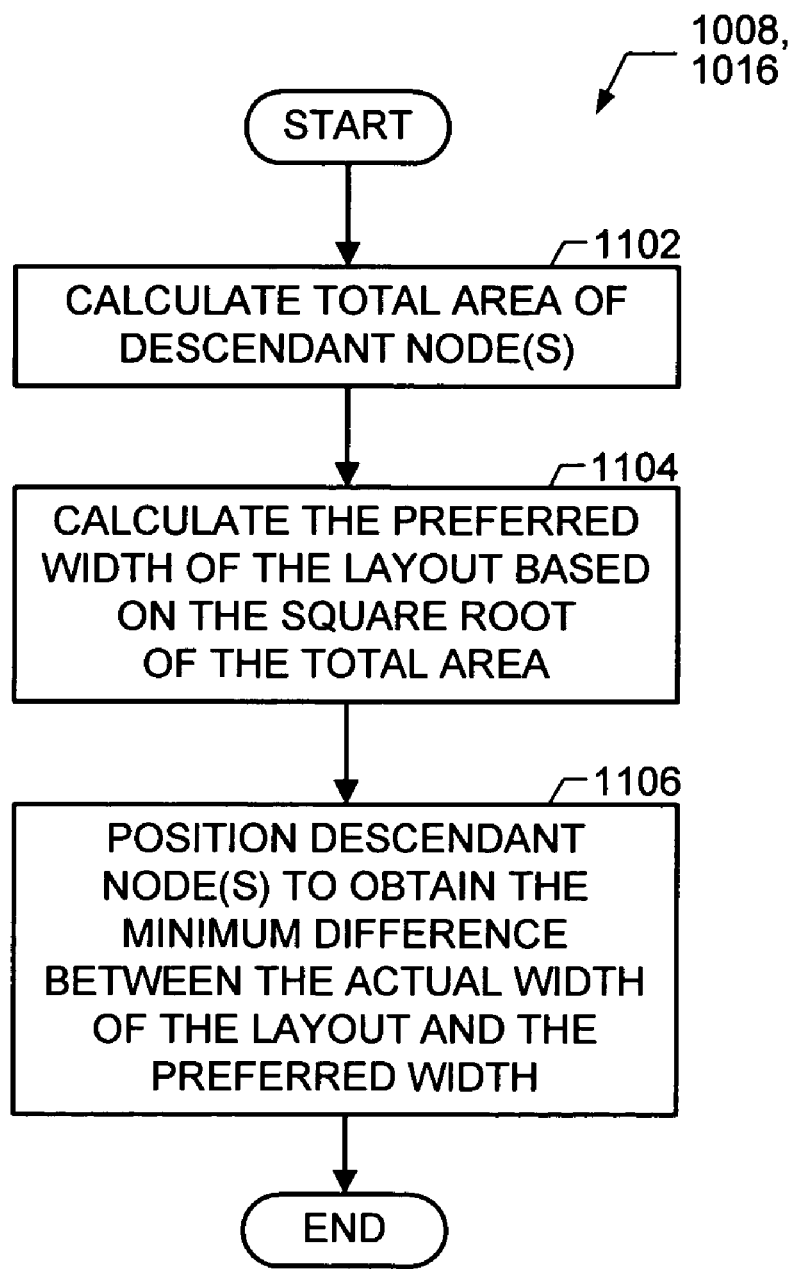
FIG. 11 is a logic flow diagram illustrating a process for arranging connected nodes into a compact layout having a preferred width in accordance with various exemplary embodiments of the present invention.

Turning now to FIG. 11, an exemplary sub-process 1008, 1016 is shown for arranging connected nodes into an exemplary compact layout having a preferred width. As discussed above, this exemplary process 1008, 1016 may be implemented for routine step 1008 and/or routine step 1016 of the exemplary process 1000. The exemplary sub-process 1008, 1016 starts with step 1102 in which the total area of the descendant node(s) is calculated, for example, by the graph layout module 204. For example, referring to FIG. 6D, the following total area can be calculated in step 1102 for the descendant nodes of non-leaf node 318 of tree layout 630:

$$(0.7 \times 1.1)+(1.5 \times 0.7)+(1.1 \times 1.1)+(0.5 \times 0.9)=3.48 \text{ sq. units} \quad \text{Eq. 1}$$

Figure 6D:
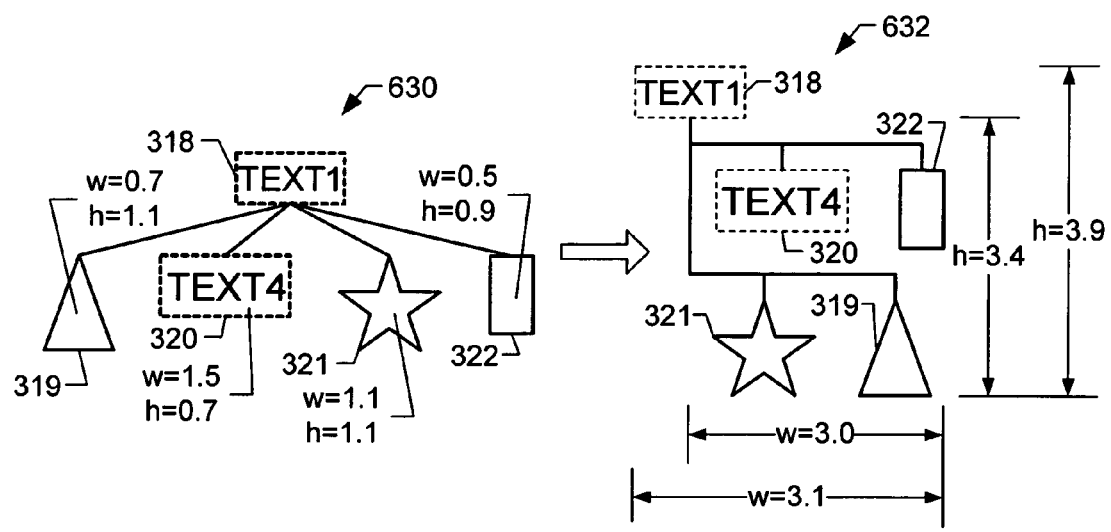
Figure 6E:
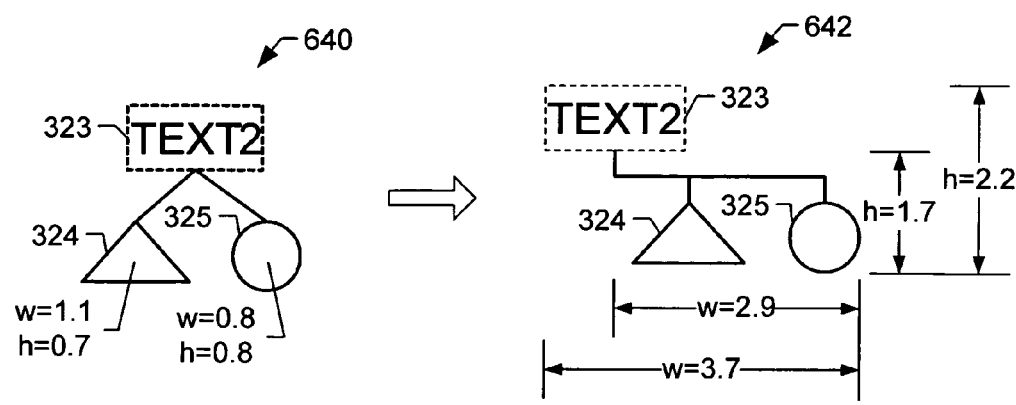

The above exemplary total area calculation is based on the approximate dimensions of the descendant nodes 319-322 shown for the sub-tree 630 in FIG. 6D. However, it should be understood that the total area calculation for step 1102 could be based on additional and/or other dimensions, such as various spacings (e.g., between nodes and edges), edge dimensions, etc. Furthermore, the total area calculation may include sub-trees formed by the descendant nodes. Thus, as another example, the following illustrates an exemplary total area calculation of the compact layout sub-trees 602, 612, 622, 632, 642 (FIGS. 6A-6E):

$$(0.6 \times 0.6)+(3.1 \times 3.6)+(2.1 \times 2.1)+(3.1 \times 3.9)+(3.7 \times 2.2) = 36.16 \text{ sq. units} \quad \text{Eq. 2}$$

The exemplary process 1008, 1016 proceeds to step 1104 in which the preferred width of a compact layout of connected descendant nodes (and/or sub-tree nodes) is calculated based on the square root of the total area of the descendant nodes. This calculation may be made by the graph layout module 204. For example, the preferred width of the compact layout 632 (FIG. 6D) of the descendant nodes 319-322 of non-leaf node 318 can be calculated as follows:

$$\sqrt{3.48}=1.87 \text{ units} \quad \text{Eq. 3}$$

As another example, the preferred width of the compact layout 500 (FIG. 5) of the descendant nodes 311-325 of the root node 310 (i.e., sub-trees 602, 612, 622, 632, 642 of FIGS. 6A-6E, respectively) can be calculated as follows:

$$\sqrt{36.16}=6.01 \text{ units} \quad \text{Eq. 4}$$

The exemplary process 1008, 1016 concludes with step 1106 in which the descendant node(s) are positioned (arranged, laid out, etc.) to obtain a minimum difference between the actual width of the compact layout of descendant node(s) and the preferred width calculated in step 1104. This step may be executed by the graph layout module 204. In this regard, as discussed above and apparent from the various exemplary compact layouts in FIGS. 5-9, the dimensions of the compact layouts may include various additional spaces, such as additional spacing between nodes and edges for purposes such as functionality and aesthetics. These additional spaces may affect the dimensions of the layout, including the actual width of the layout. Thus, a minimum difference of the actual width of the compact layout 632 (FIG. 6D) of the descendant nodes 319-322 of non-leaf node 318 to the preferred width can be calculated as:

$$3.0-1.87=1.13 \text{ units} \quad \text{Eq. 5}$$

The additional spacing can be attributed to various factors including the additional spaces between the nodes and edges in the compact layout. Ideally, the spacing between the nodes and edges of the compact layout of the descendant nodes 319-322 can be set so that the difference between the actual and preferred width of the compact layout approaches zero (i.e., aspect ratio approaches 1.0). However, such spacing may be impractical and/or undesirable since the nodes may tend to be crowded and difficult to analyze or present. Thus, additional spacing is usually preferred, which may result in some variation between the actual and preferred width of the compact layout of the descendant nodes in step 1106. However, the goal in this step 1106 is to arrange the descendant nodes to obtain a minimum difference between the actual and preferred width of the compact layout. In some exemplary embodiments of the present invention, an additional spacing value (such as a preferred spacing input received in step 1002) may be added to the width and height of the descendant nodes 319-322 before the total area calculations are performed (e.g., in Eq. 1), which may further reduce the difference between the actual and preferred width calculation in Eq. 5.

As another example with respect to step 1106, a minimum difference between the actual width of the compact layout 500 (FIG. 5) of the descendant nodes 311-325 of the root node 310 (i.e., sub-trees 602, 612, 622, 632, 642 of FIGS. 6A-6E, respectively) and the preferred width can be calculated as:

$$7.8-6.01=1.8 \text{ units} \qquad \text{Eq. 6}$$

Here again, the difference in the actual and preferred width of the compact layout 500 can be attributed, at least in part, to additional spacing such as the additional spaces between the nodes and edges in the compact layout. However, as discussed above with respect to Eq. 5, the additional spacing may alternatively be included in the total area calculations of the descendant node sub-trees 602, 612, 622, 632, 642 (e.g., in Eq. 2), which may further reduce the difference between the actual and preferred width calculation in Eq. 6.

It is noted that the additional spacing can also be affected by the criteria discussed above for routine 1008 and/or routine 1016 of obtaining a minimum difference between the width and the height of the compact layout. Thus, the spacing may also be adjusted (for example, in consideration of the preferred settings) to obtain an aspect ratio (i.e., with/height) that is as close to 1.0 as possible. Furthermore, different preferences may be set (e.g., in step 1002) for a preferred aspect ratio (or preferred minimum difference of width to height of the layout), such as a range of 0.5~2.0 or a tolerance of 1.0±0.5. Then, in step 1008 and/or 1016, the aspect ratio can alternatively be optimized toward such preferred aspect ratio. Another factor that may affect the additional spacing is the available layout area, such as the paper size, which may be input during step 1002 (FIG. 10). Other factors may also affect the additional spacing in the compact layout, which may be apparent to those skilled in the art.

Another consideration that can be made in the execution of step 1106 is the ordering of the descendant nodes (and/or sub-trees). That is, there may be various ways that the nodes can be arranged to obtain the minimum difference of the actual width with respect to the preferred width. For example, in some exemplary embodiments of the present invention, it may be preferred to arrange the nodes in an ascending (or descending) order of the width and/or area of each node as feasible while obtaining the minimum difference objective of step 1106 (and/or routine steps 1008, 1016).

Other criteria may be considered in addition and/or alternatively to the foregoing example regarding the ordering of the descendant nodes in a compact layout in step 1106, such as the type of object the node is and/or the type of data that the node presents. Another ordering criteria example may consider the number of nodes in each sub-tree arranged in the compact layout. For example, in the compact layout 500 (FIG. 5), the sub-trees 602, 612, 622, 632, 642 (FIGS. 6A-6E) are arranged in ascending order based on the number of nodes forming each sub-tree. Many other criteria (considerations, preferences, etc.) may be included in the execution of arranging the descendant nodes (and/or sub-trees) in step 1106 (and/or routine steps 1008, 1016), many of which will be apparent to those skilled in the art.

It is noted that although the above steps of the exemplary sub-process 1008, 1016 are described as being executed by the graph layout module 204, additional and/or other modules, such as the modules 202, 206, 208, may execute various steps of the sub-process 1008, 1016. Furthermore, although the exemplary sub-process 1008, 1016 is described with respect to a hierarchical connected node topology, other types of topologies may also be processed for arrangement into a compact layout, such as arbitrary data structures which include multiple-parent nodes. It should also be understood that the exemplary sub-process 1008, 1016 is merely an example of possible sub-processes that can be executed for routine steps 1008 and/or 1016, and other sub-processes may be executed within the scope of exemplary embodiments of the present invention, as may be apparent to those skilled in the art.

Having described the exemplary process 1000 and sub-process 1008, 1016, a more detailed example of arranging the general topology 300 (FIG. 3) into the compact layout 500 (FIG. 5) can be discussed with respect to these processes 1000, 1008, 1016 and the associated FIGS. 1-11. In that regard, the general topology 300 can be received as an input to the graph layout module 204 as discussed in more detail above for step 1002. Once received, the graph layout module 204 can recursively process the nodes of the general topology according to steps 1004-1014. In that regard, the graph layout module 204 can search the path from the root node 310 via edge 304, which leads to the sole leaf node 311. Since there are no non-leaf nodes along this path, the node 311 is not further arranged in steps 1004-1014, as shown by the transition (or lack thereof) from node 601 to node 602 in FIG. 6A.

The graph layout module can then search the path, for example, from the root node 310 via edge 305. The graph layout module 204 can locate the deepest non-leaf node 312 along this path, which has child (or descendant) nodes 313-315. The graph layout module 204 can then transition the corresponding sub-tree 610 for node 312 to the compact layout sub-tree 612 in accordance with routine step 1008. As depicted in FIG. 6B, the compact layout of the child nodes 313-315 in sub-tree 612 have a minimum difference between the width and the height so that the aspect ratio is almost 1.0. For example, in this case the difference is (approximately) 0.1 unit and the aspect ratio is 0.97.

After finding no other non-leaf nodes (including non-leaf sibling nodes) along the path via edge 305, the graph layout module 204 can then search the path from root node 310 via edge 306, upon which deepest non-leaf node 316 can be located. Since node 316 has only one child (or descendant) node 317, it is simply laid out according to the compact layout format, which in the case of this exemplary discussion is a down-then-right format (see e.g., discussion above of layout 902 in FIG. 9). The graph layout module 204 can then continue the search along the path including edge 307, which leads to non-leaf node 318. The graph layout module

204 can lay out the child nodes 319-322 of sub-tree 630 (FIG. 6D) in the compact layout of sub-tree 632 to obtain a minimum aspect ratio of 3.0/3.4=0.88.

The graph layout module 204 can then search the last unsearched path in this exemplary discussion, which includes edge 308 from the root node 310. The graph layout module 204 can locate deepest non-leaf node 323 along this path, which has two child nodes 324, 325. The graph layout can position the child nodes 324, 325 in the compact layout of the sub-tree 642 (FIG. 6E) from the general topology of sub-tree 640 to obtain a minimum aspect ratio of 2.9/1.7=1.7.

Once the graph layout module 204 has searched all paths and arranged all of the child sub-trees of root node 310 into compact layouts 602, 612, 622, 632, 642, the module 204 can execute step 1016. The graph layout module 204 can consider the overall area of each compact layout sub-tree 602, 612, 622, 632, 642 to provide the overall compact layout 500 of the general topology 300 of connected nodes, for example, based on the calculations in Eqs. 2 and 4 above. The resulting compact layout 500 has a minimum aspect ratio of 7.8/7.4=1.05 (or a minimum width to height difference of 0.4 units). As calculated above in Eq. 6, the compact layout has a difference of actual to preferred width of 1.8 units in accordance with steps 1102-1106 (FIG. 11). It is noted that the overall dimensions of the compact layout 500 include the additional spaces from, for example, the spacing between the nodes and the edges in the compact layout 500. Furthermore, it is noted that the compact layout 500 and its sub-trees 602, 612, 622, 632, 642 are all in a down-then-right format, although other formats are possible as discussed above for FIG. 9.

It should be understood that the foregoing relates only to illustrative, exemplary embodiments of the present invention. Therefore, it should be further understood that numerous changes may be made therein without departing from the spirit and scope of the invention as defined by the following claims.

What is claimed is:

1. A computer-implemented method for providing a compact layout of connected nodes, comprising:
    searching for a deepest non-leaf node along an unsearched path of edges from a root node of a hierarchical configuration of connected nodes, wherein the configuration includes an edge between each pair of connected nodes;
    when a deepest non-leaf node is found along the unsearched path, positioning all descendant nodes of the deepest non-leaf node into a first compact layout of connected nodes, wherein the difference between the width and the height of the first compact layout is minimized;
    determining whether the deepest non-leaf node has a non-leaf sibling node;
    when the deepest non-leaf node has a non-leaf sibling node, positioning all descendant nodes of the non-leaf sibling node of the deepest non-leaf node into a second compact layout of connected nodes, wherein the difference between the width and the height of the second compact layout is minimized;
    determining whether a parent node of the deepest non-leaf node is the root node;
    when the parent node of the deepest non-leaf node is not the root node, positioning all descendant nodes of the parent node of the deepest non-leaf node, including a sub-tree resulting from the positioning all descendant nodes of the deepest non-leaf node, into a third compact layout of connected nodes, wherein the difference between the width and the height of the third compact layout is minimized;
    repeating, for each path of edges from the root node, the foregoing steps of (a) searching for a deepest non-leaf node, (b) positioning all descendant nodes of the deepest non-leaf node, (c) positioning all descendant nodes of a non-leaf sibling node, and (d) positioning all descendant nodes of a parent node;
    positioning all descendant nodes of the root node, including all child sub-trees of the root node resulting from the repeating, into a fourth compact layout of connected nodes, wherein the difference between the width and the height of the fourth compact layout is minimized; and
    rendering the positioned nodes of the fourth compact layout on an output devices wherein rendering includes depicting each of the positioned nodes and the edge between each pair of connected nodes.

2. The computer-implemented method of claim 1, wherein positioning all descendant nodes of the deepest non-leaf node into the first compact layout comprises:
    calculating a total area of the all descendant nodes of the deepest non-leaf node;
    calculating a preferred width of the first compact layout as the square root of the total area; and
    positioning the all descendant nodes of the deepest non-leaf node into the first compact layout wherein the difference between the actual width and the preferred width of the first compact layout is minimized.

3. The computer-implemented method of claim 1, wherein positioning all descendant nodes of the non-leaf sibling node of the deepest non-leaf node into the second compact layout comprises:
    calculating a total area of the all descendant nodes of the non-leaf sibling node;
    calculating a preferred width of the second compact layout as the square root of the total area; and
    positioning the all descendant nodes of the non-leaf sibling node into the second compact layout wherein the difference between the actual width and the preferred width of the second compact layout is minimized.

4. The computer-implemented method of claim 1, wherein positioning all descendant nodes of the parent node of the deepest non-leaf node into the third compact layout comprises:
    calculating a total area of all descendant nodes of the parent node, including the area of the sub-tree resulting from the positioning all descendant nodes of the deepest non-leaf node;
    calculating a preferred width of the third compact layout as the square root of the total area; and
    positioning the all descendant nodes of the parent node into the third compact layout wherein the difference between the actual width and the preferred width of the third compact layout is minimized.

5. The computer-implemented method of claim 1, wherein positioning all descendant nodes of the root node into the fourth compact layout comprises:
    calculating a total area of all descendant nodes of the root node, including the area of each child sub-tree of the root node resulting from the repeating;
    calculating a preferred width of the fourth compact layout as the square root of the total area; and
    positioning the all descendant nodes of the root node into the fourth compact layout wherein the difference between the actual width and the preferred width of the fourth compact layout is minimized.

6. A computer-readable storage medium having computer-executable instructions for providing a compact layout of connected nodes, the instructions implementing a method comprising:

receiving an input of data representing a hierarchical configuration of connected nodes, wherein the configuration includes a branch between each pair of connected nodes;

locating a deepest internal node along an unsearched path of branches from a root node of the hierarchical configuration of connected nodes;

arranging all descendant nodes of the deepest internal node into a first compact layout of connected nodes, wherein the ratio between the width and the height of the first compact layout is optimized toward a first preferred aspect ratio;

arranging all descendant nodes of a parent node of the deepest internal node, including a sub-tree formed by the deepest internal node and the first compact layout, into a second compact layout of connected nodes, wherein the ratio between the width and the height of the second compact layout is optimized toward a second preferred aspect ratio;

arranging all descendant nodes of the root node, including all resultant child sub-trees of the root node, into a third compact layout of connected nodes wherein the ratio between the width and the height of the third compact layout is optimized toward a third preferred aspect ratio; and rendering the arranged nodes of the third compact layout on an output device, wherein rendering includes depicting each of the arranged nodes and the branch between each pair of connected nodes.

7. The computer-readable medium of claim 6, further comprising:

receiving a selection of the first, second, and third preferred aspect ratios for the ratio of the width to the height of the first, second, and third compact layouts, respectively;

receiving a selection of a layout format for the first, second, and third compact layouts, wherein the layout format determines a routing of the branches to the connected nodes; and receiving a selection of a preferred spacing for the connected nodes and the branches within the first, second, and third compact layouts.

8. The computer-readable medium of claim 6, wherein arranging all descendant nodes of the deepest internal node into the first compact layout comprises:

calculating a total area of the all descendant nodes;

calculating a preferred width of the first compact layout as the square root of the total area; and arranging the all descendant nodes into the first compact layout wherein the difference between the actual width and the preferred width of the first compact layout is minimized.

9. The computer-readable medium of claim 6, wherein arranging all descendant nodes of the parent node of the deepest internal node comprises:

calculating a total area of all descendant nodes of the parent node, including the area of the sub-tree formed by the deepest internal node and the first compact layout;

calculating a preferred width of the second compact layout as the square root of the total area; and arranging the all descendant nodes of the parent node into the second compact layout wherein the difference between the actual width and the preferred width of the second compact layout is minimized.

10. The computer-readable medium of claim 6, wherein arranging all descendant nodes of the root node comprises:

calculating a total area of all descendant nodes of the root node, including the area of each resultant child sub-tree of the root node;

calculating a preferred width of the third compact layout as the square root of the total area; and arranging the all descendant nodes of the root node into the third compact layout wherein the difference between the actual width and the preferred width of the third compact layout is minimized.

* * * * *

UNITED STATES PATENT AND TRADEMARK OFFICE
CERTIFICATE OF CORRECTION

| | |
|---|---|
| PATENT NO. | : 7,363,583 B1 |
| APPLICATION NO. | : 10/786384 |
| DATED | : April 22, 2008 |
| INVENTOR(S) | : Jason Churchill Costa |

It is certified that error appears in the above-identified patent and that said Letters Patent is hereby corrected as shown below:

In column 18, line 17, in Claim 1, delete "devices" and insert -- device, --, therefor.

Signed and Sealed this
Twelfth Day of July, 2011

David J. Kappos
*Director of the United States Patent and Trademark Office*